US010798278B2

United States Patent
Baek et al.

(10) Patent No.: US 10,798,278 B2
(45) Date of Patent: Oct. 6, 2020

(54) ULTRAVIOLET MIRROR DEVICE AND METHOD THEREFOR USING PORTABLE TERMINAL

(71) Applicant: UNION COMMUNITY CO., LTD., Seoul (KR)

(72) Inventors: Young Hyun Baek, Seoul (KR); Yo Shik Shin, Seoul (KR)

(73) Assignee: UNION COMMUNITY CO., LTD., Seoul (KR)

( * ) Notice: Subject to any disclaimer, the term of this patent is extended or adjusted under 35 U.S.C. 154(b) by 0 days.

(21) Appl. No.: 16/308,705

(22) PCT Filed: May 26, 2017

(86) PCT No.: PCT/KR2017/005518
§ 371 (c)(1),
(2) Date: Dec. 10, 2018

(87) PCT Pub. No.: WO2018/008846
PCT Pub. Date: Jan. 11, 2018

(65) Prior Publication Data
US 2019/0149705 A1    May 16, 2019

(30) Foreign Application Priority Data

Jul. 5, 2016 (KR) .......................... 10-2016-0084942

(51) Int. Cl.
*G01J 1/04* (2006.01)
*H04N 5/225* (2006.01)
(Continued)

(52) U.S. Cl.
CPC .......... *H04N 5/2254* (2013.01); *G01J 1/0437* (2013.01); *G01J 1/42* (2013.01);
(Continued)

(58) Field of Classification Search
CPC ......... H04N 5/2254; G01J 1/0437; G01J 1/42
See application file for complete search history.

(56) References Cited

U.S. PATENT DOCUMENTS

2018/0120151 A1* 5/2018 Feldman ............... G01J 1/0219
2019/0125249 A1* 5/2019 Rattner ................. A61B 5/442

FOREIGN PATENT DOCUMENTS

JP         2007-150924 A    6/2007
KR    10-2005-0017304 A    2/2005
(Continued)

OTHER PUBLICATIONS

International Search Report dated Aug. 23, 2017, issued to International Application No. PCT/KR2017/005518.
(Continued)

*Primary Examiner* — Hugh Maupin
(74) *Attorney, Agent, or Firm* — Stein IP, LLC

(57) ABSTRACT

Disclosed are an ultraviolet mirror device and a method therefor. The ultraviolet mirror device of the present invention relates to a device that can generate an image obtained by capturing an image of skin in the ultraviolet region. The device can be connected to a portable terminal having a display unit, so as to be used as an ultraviolet mirror. To this end, the ultraviolet mirror device includes an ultraviolet filtering unit provided in a front portion or a rear portion of the lens unit to allow ultraviolet light to pass therethrough and thus enter the image sensor; and an image processing unit providing the portable terminal with multiple digital images generated at a predetermined frame rate per second by the image sensor and thus allowing a moving image to be regenerated in the display unit.

3 Claims, 4 Drawing Sheets

(51) Int. Cl.
*G01J 1/42* (2006.01)
*G02B 5/28* (2006.01)
*G02B 5/20* (2006.01)
*G02B 7/00* (2006.01)

(52) U.S. Cl.
CPC .............. *G01J 1/429* (2013.01); *G02B 5/208* (2013.01); *G02B 5/28* (2013.01); *G02B 7/006* (2013.01); *H04N 5/225* (2013.01)

(56) References Cited

FOREIGN PATENT DOCUMENTS

| KR | 10-2005-0022934 A | 3/2005 |
| KR | 10-2005-0028726 A | 3/2005 |
| KR | 10-2006-0104963 A | 10/2006 |

OTHER PUBLICATIONS

Korean Office Action dated May 30, 2017, issued to Korean Application No. 10-2016-0084942.

* cited by examiner (a)                          (b)

ULTRAVIOLET MIRROR DEVICE AND METHOD THEREFOR USING PORTABLE TERMINAL

CROSS-REFERENCE TO RELATED APPLICATIONS

This application is a national stage of International Application No. PCT/KR2017/005518, filed May 26, 2017, which claims the benefit of priority to Korean Application No. 10-2016-0084942, filed Jul. 5, 2016, in the Korean Intellectual Property Office, the disclosures of which are incorporated herein in their entireties by reference.

TECHNICAL FIELD

The present invention relates to an ultraviolet mirror device for use in connection with a portable terminal having a display unit and, more particularly, to an ultraviolet mirror device and a method therefor, which are capable of capturing an image of skin coated with an ultraviolet blocking agent to enable checking a coating state thereof.

BACKGROUND ART

Ultraviolet (UV) blocking agents can be broadly divided into two types, chemical blocking agents and physical blocking agents, depending on their functional groups. The chemical blocking agent is a method of absorbing ultraviolet light of the sun's rays in order to block the ultraviolet light, and the physical blocking agent reflects or scatters ultraviolet light to prevent penetration into the skin. The physical blocking agents have good blocking effect, but they are not frequently used for cosmetic reasons because they are opaque materials (mainly white).

The chemical blocking agents have a disadvantage of causing irritant contact dermatitis in sensitive skin, but the chemical blocking agents are made of transparent materials and have no cosmetic problems, so that they are materials of most ultraviolet blocking agents that are currently in use. Among ultraviolet light contained in the sun's rays, ultraviolet light affecting the skin is divided into UVA having a relatively longer wavelength and UVB having a shorter wavelength. Most chemical ultraviolet blocking agents are effective against UVB compared to UVA, but on the contrary, there are blocking agents that are more effective against UVA than UVB.

The physical blocking agents have an advantage in that the coating portion thereof can be relatively well checked because the physical blocking agents leave a whitish coat on the face or skin. On the other hand, since the chemical blocking agent penetrates the skin, it is difficult to confirm the coating portion thereof. Therefore, in the case of the chemical blocking agent, it may be considered that it is sufficiently coated to the face or the skin, but in actuality, cases that the blocking agent is not properly coated to some areas occurs often. In recent years, a suitable mixture of physical and chemical blocking agents has been developed.

Meanwhile, ultraviolet cameras known in the related art are expensive devices including a high-quality CMOS image sensor applied to a digital single lens reflex (DSLR) camera, a expensive special filter for filtering ultraviolet light in the range of 315 to 380 nm, and ISO control function and are quite bulky, so that they have not been widely available for personal use or home use.

DISCLOSURE

Technical Problem

An object of the present invention is to provide an ultraviolet mirror device and a method therefor, in which the ultraviolet mirror device generates an image obtained by taking an image of a subject, particularly, skin in the ultraviolet region and is connected to a portable terminal having a display unit, so as to be used as an ultraviolet mirror.

It is still another object of the present invention to provide an ultraviolet mirror device and a method therefor, which can check whether or not a chemical blocking agent is properly applied to skin by projecting ultraviolet light on skin coated with the chemical blocking agent and capturing an image of the skin.

Technical Solution

In order to achieve the above objects, an ultraviolet mirror device according to the present invention includes a lens unit and an image sensor to generate a digital image of a subject and is connected to a portable terminal having a display unit. Specifically, the ultraviolet mirror device according to the present invention includes an ultraviolet filtering unit, an image processing unit, and a casing. The ultraviolet filtering unit is provided in a front portion or a rear portion of the lens unit to allow ultraviolet light to pass therethrough and thus enter the image sensor. The image processing unit provides the portable terminal with multiple digital images generated at a predetermined frame rate per second by the image sensor and thus allowing a moving image to be regenerated in the display unit. The casing is mounted on the portable terminal in such a manner as to capture an image of the subject positioned in front of the display unit, whereby the display unit is used as a mirror.

According to an embodiment, the ultraviolet filtering unit may include a first filter allowing the UVA region to pass therethrough; a second filter provided in parallel to the first filter to allow the UVB region to pass therethrough; and a filter transfer unit transferring at least one selected from the first filtering unit and the second filtering unit to the front portion or the rear portion of the lens unit.

For example, the filter transfer unit may include a first slider allowing the first filter to be horizontally transferred; and a second slider allowing the second filter to be horizontally transferred.

In addition, the ultraviolet mirror device according to the present invention may include a terminal block that is coupled to a terminal block provided in a side end portion of the portable terminal thereby receiving direct current power via the terminal block of the portable terminal. Since the terminal block is coupled to the terminal block of the portable terminal, the casing may be mounted on the portable terminal in such a form as to capture an image of the subject positioned in front of the display unit.

Advantageous Effects

According to the present invention, an ultraviolet mirror device can generate an image obtained by irradiating skin with ultraviolet light and then capturing ultraviolet light reflected from the skin and can check the coating state of the chemical ultraviolet blocking agent through the captured image.

In addition, the ultraviolet mirror device is connected to a portable terminal such as a smart phone having a display unit to display the captured image and is thus used as an ultraviolet mirror when capturing an image of a user's face or the like.

Accordingly, a user who connects the ultraviolet mirror device of the present invention to a terminal such as a smart phone can check his or her face mirrored on the display unit of the smart phone while coating the chemical blocking agent to his or her face and also check whether or not the blocking agent is properly coated to all the areas of his or her face.

BEST MODE

Hereinafter, the present invention will be described in detail with reference to the drawings.

Figure 1:
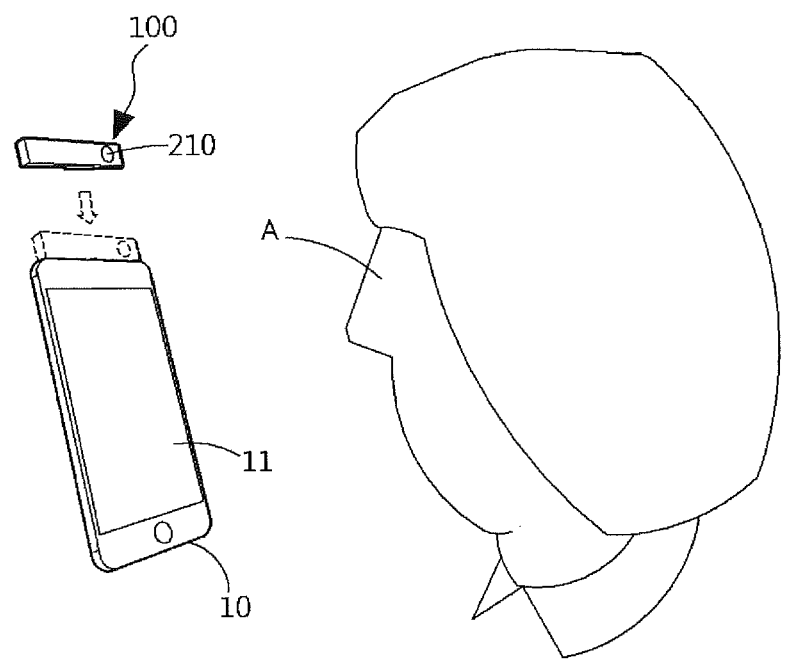
FIG. 1 is a view showing an ultraviolet mirror device mounted on a portable terminal according to the present invention.
Figure 2:
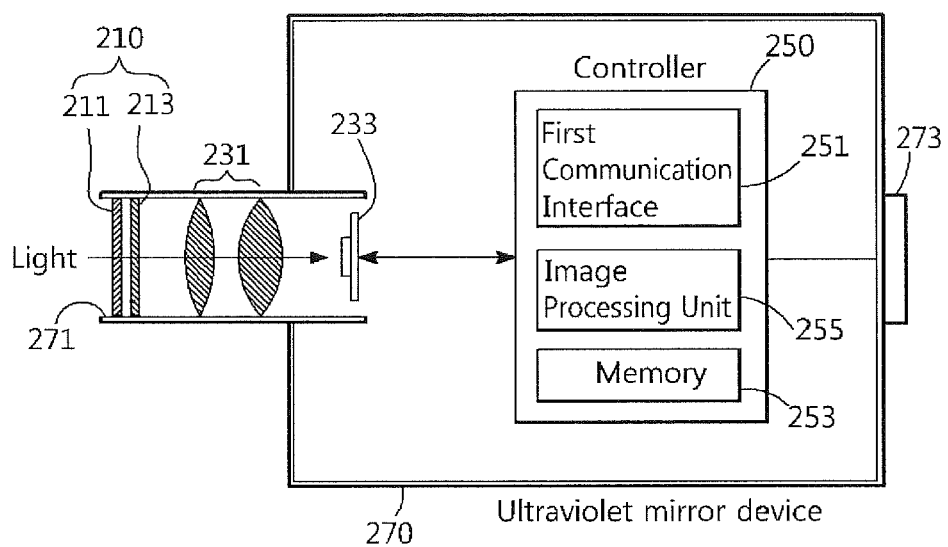
FIG. 2 is a block diagram of an ultraviolet mirror device according to an embodiment of the present invention.

Referring to FIGS. 1 and 2, an ultraviolet mirror device 100 according to the present invention radiates ultraviolet light toward a subject A and then generates digital image of the subject A using the ultraviolet light reflected from the subject A.

Also, the ultraviolet mirror device 100 may be externally mounted on a portable terminal 10 having a display unit 11, and the portable terminal 10 may provide a digital image to cause the display unit 11 to display the same. For example, the ultraviolet mirror device 100 of the present invention is provided to enable visually checking the degree of coating of the blocking agent through the display unit 11 of the portable terminal 10 during applying the ultraviolet blocking agent to skin such as facial skin (hereinafter, referred to as subject).

Referring to FIG. 2, the ultraviolet mirror device 100 includes an ultraviolet filtering unit 210, a lens unit 231, and an image sensor unit 233 as configurations for generating an image. Also, the ultraviolet mirror device 100 includes a controller 250 that processes the ultraviolet image generated by the image sensor unit 233 and a casing 270 that accommodates all of components mentioned above.

The casing 270 is preferably provided in such a manner as to be externally mounted on the portable terminal 10, and it is preferable that the casing 270 is made as small as possible considering the size of the portable terminal 10. The casing 270 is provided at the front thereof with an opening 271 through which external light enters and at the other side thereof with a terminal block 273 used for connecting with the portable terminal 10.

The ultraviolet filtering unit 210, the lens unit 231, and the image sensor unit 233 are disposed on a single optical path that passes through the center of the opening 271 in vertical direction, thereby generating a digital image of the ultraviolet region among light (image) entered from the subject A.

At least one of the ultraviolet filtering unit 210 and the lens unit 231 may be exposed to the outside of the opening 271.

The ultraviolet filtering unit 210 is at least one optical filter that passes only the ultraviolet region of the entered light. As shown in FIG. 2, the ultraviolet filtering unit 210 may be disposed in front of the lens unit 231, or may be disposed between the lens unit 231 and the image sensor unit 233.

Since the filtering bandwidth or wavelength of the ultraviolet filtering unit 210 is the most important factor that determines the performance of the ultraviolet mirror device 100 of the present invention, it is preferable that the filtering bandwidth is designed to pass only the reference band.

Herein, the reference band means an ultraviolet bandwidth which the chemical ultraviolet blocking agent may absorb, and corresponds to at least one bandwidth selected from UVA and UVB bands. However, when the ultraviolet mirror device 100 of the present invention is implemented at an price cheap enough to be used as an accessory of the portable terminal 10 such as a smart phone, it is difficult to have a precisely designed filtering bandwidth by distinguishing UVA from UVB, and it is needed to use low-priced commercially available ultraviolet filters. In this case, a low-priced commercial ultraviolet filter may have various types of bandwidths without filtering only ultraviolet light properly. Herein, the ultraviolet filtering unit 210 may be provided to have a desired filtering bandwidth and at the same time be at a low cost by combining a plurality of filters having different types of bandwidths.

The lens unit 231 focuses the light incident from the subject on the image sensor unit 233, and the image sensor unit 233 generates a digital image of the incident light (or image). Herein, the bandwidth that is capable of being processed by the image sensor unit 233 has to include the ultraviolet band, in which the image sensor unit 233 may mostly process the ultraviolet region. Since the image generated by the image sensor unit 233 is generated from the image of state in which the color region of the visible light is completely removed, it becomes a monochrome image expressed by only the grayscale value.

The image generated by the image sensor unit 233 may be a single still image, but it is preferable to generate an image (moving picture) at a predetermined frame rate per second in order to display the user's image like a mirror. The image sensor unit 233 provides the generated image to the controller 250.

Herein, a process of generating an ultraviolet image through the ultraviolet filtering unit 210, the lens unit 231, and the image sensor unit 233 will be briefly described. When a user coats the ultraviolet blocking agent to skin such as facial skin (herein, subject), the ultraviolet mirror device 100 of the present invention is provided so that the user checks a portion of the skin coated with the ultraviolet blocking agent and a portion of the skin not coated with the ultraviolet blocking agent and visually checks the degree of coating of the blocking agent.

First, when the ultraviolet blocking agent is chemically coated to the subject (skin) A, the amount of ultraviolet light of the sun's rays incident to the subject is absorbed by the blocking agent and thus the amount of ultraviolet reflected to the outside is reduced. On the contrary, the ultraviolet light is absorbed into the skin and a considerable amount of ultraviolet light is also reflected in a portion where the ultraviolet blocking agents are not coated. Recently, in the case of the ultraviolet blocking agent in which the chemical blocking agent and the physical blocking agent are mixed, the similar phenomenon occurs due to the chemical blocking agent.

Figure 4:
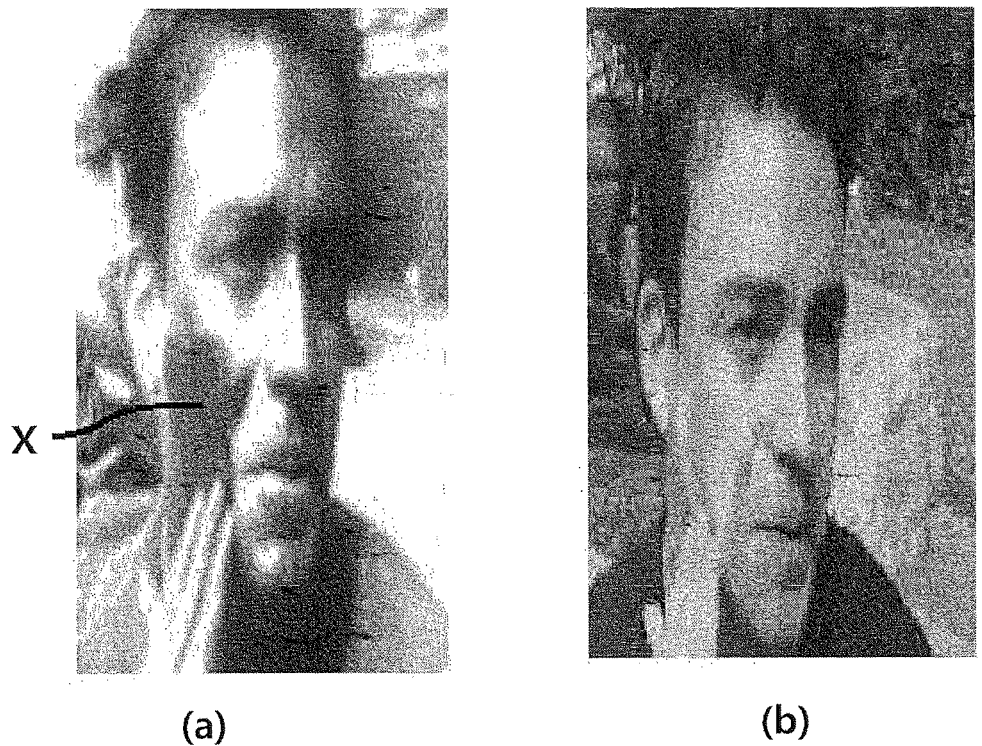
FIG. 4 is a view comparing an image captured by a normal camera with an image captured by an ultraviolet mirror device of the present invention.

Therefore, light incident on the ultraviolet mirror device 100 includes part of outside natural light together with light reflected from the subject A, but only ultraviolet light passes through the ultraviolet filtering unit 210. The ultraviolet light passing through the ultraviolet filtering unit 210 is converted into a digital image by the image sensor unit 233 through the lens unit 231. For example, FIG. 4 shows (a) an image captured with the ultraviolet mirror device 100 and (b) an image captured with a normal camera. Referring to (a) in FIG. 4, other portion except a specific portion x of the subject A has a bright gradation, while the specific portion x is displayed in black. The specific portion x displayed in black refers to a region where the ultraviolet light is hardly reflected and indicates a considerable amount of the ultraviolet light is absorbed by the ultraviolet blocking agent.

The image generated by the image sensor unit 233 is processed by the controller 250. The controller 250 includes a first communication interface 251, a memory 253, and an image processing unit 255, and stores the ultraviolet image generated by the image sensor unit 233 and provides the same to the portable terminal 10.

The first communication interface 251 is a communication interface for providing images or moving images with the portable terminal 10 and provides the images to the portable terminal 10 in accordance with a predetermined protocol. In the memory 253, an image generated by the image sensor unit 233 is stored.

The image processing unit 255 controls the overall operation of the ultraviolet mirror device 100 of the present invention.

First, the image processing unit 255 controls the image sensor unit 233 to generate a digital image according to a control command received from the portable terminal 10 through the first communication interface 251. The image processing unit 255 also provides the portable terminal 10 with at least one image generated by the image sensor unit 233 via the first communication interface 251. Accordingly, the portable terminal 10 displays the ultraviolet image to the user as a mirror through the display unit 11.

Portable Terminal

The portable terminal 10 applied to the present invention includes the display unit 11 and is connected to the ultraviolet mirror device 100 to allow the ultraviolet image provided by the ultraviolet mirror device 100 to be displayed on the display unit 11. Therefore, it is fine that the portable terminal 10 is a device having a main function (telephone, web browsing, etc.) other than the function of the present invention. For example, a recent smart phone is a typical example of the portable terminal 10.

Figure 3:
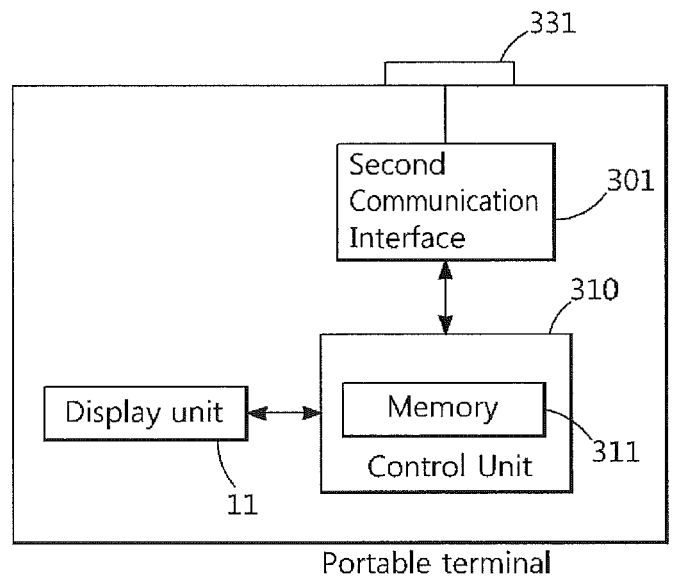
FIG. 3 is a block diagram of a portable terminal of the present invention.

Referring to FIG. 3, the portable terminal 10 includes the second communication interface 301, the display unit 11, and the control unit 310. As described above, the portable terminal 10 understandably includes a configuration for the main function other than the function of the present invention, but such configuration or function is not essential to the present invention and does not contribute to the description of the present invention, whereby it is not shown in the drawings and the description thereof is omitted.

The second communication interface 301 is connected to the first communication interface 251 to receive an image provided by the ultraviolet mirror device 100 and provide the same to the control unit 310. The display unit 11 is disposed on the front surface of the portable terminal 10 to display the ultraviolet images provided by the ultraviolet mirror device 100 to a user.

The control unit 310 includes a mirror function unit 311. The control unit 310 may be interpreted as a configuration specially provided for the present invention, but it may be a configuration provided to perform the main function of the portable terminal 10 described above.

When the control unit 310 is a configuration provided to perform the main function of the portable terminal 10, the control unit 310 may be a functional indication of a configuration implemented by a processor chip (hardware) that is hardware fundamentally included in the portable terminal, and a processor chip that is software processed by the chip. Herein, the application is software written in a programming language that may be interpreted by a computer to process a specified set of instructions.

The mirror function unit 311 may be one of the applications and one program or multiple program assemblies installed for the implementation of the present invention and executed by the processor chip. The user may download the application from a program distribution server (not shown) called "App Store" and install the mirror function unit 311 on his or her portable terminal 10.

Specifically, the mirror function unit 311 (1) allows the image processing unit 255 of the ultraviolet mirror device 100 to capture an ultraviolet image and (2) performs control so that the image is displayed on the display unit 11 when the image processing unit 255 provides the ultraviolet image, in accordance with user's control.

Connection of Ultraviolet Mirror Device with Portable Terminal

The ultraviolet mirror device 100 captures an ultraviolet image in a state that it is connected to the portable terminal 10. Herein, in order for the display unit 11 of the portable terminal 10 to be used as a mirror, the ultraviolet mirror device 100 has to be mounted on the portable terminal 10 to allow the image of the subject A positioned in front of the display unit 11 to be captured.

For example, (1) the terminal block 273 of the ultraviolet mirror device 100 may be coupled electrically and mechanically to the terminal block 331 of the portable terminal 10 by connecting the terminal block 273 directly to the terminal block 331, as shown in FIG. 1. Alternatively, (2) the ultraviolet mirror device 100 may be connected to the portable terminal 10 via an electrical connection means separate from the mechanical mounting means in a state of being mounted via separate mechanical mounting means, and (3) the ultraviolet mirror device 100 may be electrically connected by a separate means without being mounted on the portable terminal 10.

For example, as shown in FIG. 1, the terminal block 273 is directly coupled to a terminal block 331 provided at a side end portion of the portable terminal 10, whereby the ultraviolet mirror device 100 is mounted on the portable terminal 10 in such a form as to be able to capture the image of the subject A positioned in front of the display unit 11.

Whatever the connection method, the ultraviolet mirror device 100 of the present invention is operated by directly receiving direct current power from the portable terminal 10 through the terminal block 273 without a need to have an internal power source.

Embodiment: Ultraviolet Filtering Unit

Preferably, since the ultraviolet blocking agent is classified as having a substantial effect on only UVB, having a substantial effect on only UVA, or having an effect mainly on UVB and also an effect on UVA, it is preferable that the ultraviolet filtering unit 210 may pass all of UVA and UVB but pass UVA and UVB separately.

In the embodiment of FIG. 2, the ultraviolet filtering unit 210 includes a first filter 211 passing only UVA region and a second filter 213 passing only UVB region.

In addition, the ultraviolet filtering unit 210 preferably includes a filter transfer unit for transferring at least one selected from the first filter 211 and the second filter 213 to the front (or rear) of the lens unit 231. The filter transfer unit has only the first filter 211 disposed in the front of the lens unit 231 to pass only UVA light, only the second filter 213 disposed to pass only UVB light, or both the first filter 211 and the second filter 213 disposed to pass both UVA and UVB light.

Figure 5:
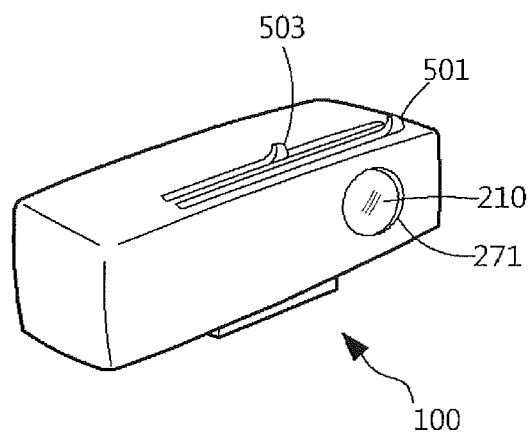
FIG. 5 is a diagram illustrating an ultraviolet mirror device according to an embodiment of the present invention.

For example, referring to FIG. 5, the filter transfer unit includes a first slider 501 allowing the first filter 211 to be horizontally transferred due to an external force and thus disposed in front (or rear) of the lens unit 231 and a second slider 503 allowing the second filter 213 to be horizontally transferred due to an external force and thus disposed in front (or rear) of the lens unit 231. Each of the first slider 501 and the second slider 503 includes a transferring track disposed in the horizontal direction, a slit formed in the horizontal direction against the transporting track, and a transferring unit interposed between the transferring track and the slit to accommodate the first filter 211 or the second filter 213 and having a protrusion formed on one side thereof. The protrusion is exposed to the outside in a state of being inserted into the slit.

The user may push the first slider 501 and/or the second slider 503 along the slit to cause the first filter 211 and/or the second filter 213 to be disposed in a light path.

In the example of FIG. 5, only the first filter 211 is mounted on the front of the lens unit 231 by the first slider 501.

While the present invention has been particularly shown and described with reference to exemplary embodiments thereof, it is clearly understood that the same is by way of illustration and example only and is not to be construed as limiting the scope of the invention as defined by the appended claims. It will be understood by those skilled in the art that various changes in form and details may be made therein without departing from the spirit and scope of the invention.

The invention claimed is:

1. An ultraviolet mirror device that includes a lens unit and an image sensor to generate a digital image of a subject and is connected to a portable terminal having a display unit, the device comprising:
    an ultraviolet filtering unit provided in a front portion or a rear portion of the lens unit to allow ultraviolet light to pass therethrough and thus enter the image sensor;
    an image processing unit providing the portable terminal with multiple digital images generated at a predetermined frame rate per second by the image sensor and thus allowing a moving image to be regenerated in the display unit; and
    a casing mounted on the portable terminal in such a manner as to capture an image of the subject positioned in front of the display unit, whereby the display unit is used as a mirror,
wherein the ultraviolet filtering unit includes:
a first filter allowing the UVA region to pass therethrough;
a second filter provided in parallel to the first filter to allow the UVB region to pass therethrough; and
a filter transfer unit transferring at least one selected from the first filtering unit and the second filtering unit to the front portion or the rear portion of the lens unit.

2. The device of claim 1, wherein the filter transfer unit includes:
    a first slider allowing the first filter to be horizontally transferred; and
    a second slider allowing the second filter to be horizontally transferred.

3. The device of claim 1, further comprising:
    a terminal block coupled to a terminal block provided in a side end portion of the portable terminal to cause the casing to be mounted on the portable terminal in such a form as to capture an image of the subject positioned in front of the display unit and receiving direct current power via the terminal block of the portable terminal.

\* \* \* \* \*